United States Patent
Lebrun et al.

(10) Patent No.: US 9,383,457 B2
(45) Date of Patent: Jul. 5, 2016

(54) DETECTOR FOR DETECTING THE TRACES OF IONIZING PARTICLES

(71) Applicants: Commissariat à l'énergie atomique et aux énergies alternatives, Paris (FR); Centre National de la Recherche Scientifique (CNRS ), Paris (FR)

(72) Inventors: François Lebrun, Champigny sur Marne (FR); Régis Terrier, Paris (FR); Philippe Laurent, Bures sur Yvette (FR); Christian Olivetto, Fresnes (FR); Eric Breelle, Alfortville (FR)

(73) Assignees: COMMISSARIAT À L'ÉNERGIE ATOMIQUE ET AUX ÉNERGIES ALTERNATIVES, Paris (FR); CENTRE NATIONAL DE LA RECHERCHE SCIENTIFIQUE (CNRS), Paris (FR)

( * ) Notice: Subject to any disclaimer, the term of this patent is extended or adjusted under 35 U.S.C. 154(b) by 0 days.

(21) Appl. No.: 14/779,675

(22) PCT Filed: Mar. 20, 2014

(86) PCT No.: PCT/EP2014/055589
§ 371 (c)(1),
(2) Date: Sep. 24, 2015

(87) PCT Pub. No.: WO2014/154556
PCT Pub. Date: Oct. 2, 2014

(65) Prior Publication Data
US 2016/0054456 A1    Feb. 25, 2016

(30) Foreign Application Priority Data

Mar. 25, 2013  (FR) ...................... 13 52626

(51) Int. Cl.
*G01T 1/20*     (2006.01)

(52) U.S. Cl.
CPC ............. *G01T 1/2018* (2013.01); *G01T 1/2002* (2013.01)

(58) Field of Classification Search
CPC ........................... G01T 1/2002; G01T 1/2018
See application file for complete search history.

(56) References Cited

U.S. PATENT DOCUMENTS 8,017,906 B2    9/2011  Nelson et al.

FOREIGN PATENT DOCUMENTS

DE    10 2006 042 484 A1    10/2007
EP        1 967 868 A2       9/2008
WO    WO 2012/058440 A1      5/2012

OTHER PUBLICATIONS

International Search Report as issued in International Patent Application No. PCT/EP2014/055589, dated Jun. 3, 2014.

*Primary Examiner* — Mark R Gaworecki
(74) *Attorney, Agent, or Firm* — Pillsbury Winthrop Shaw Pittman LLP

(57) ABSTRACT

A detector for detecting the traces of ionizing particles includes a scintillator capable of emitting photons when ionizing particles pass therethrough; a first imager capable of detecting each photon emitted by the scintillator, and a first microlens array, each microlens of the first microlens array being arranged such as to produce an image of the trace of the particles by focusing the photons emitted in the scintillator on the first imager.

13 Claims, 2 Drawing Sheets

DETECTOR FOR DETECTING THE TRACES OF IONIZING PARTICLES

CROSS-REFERENCE TO RELATED APPLICATIONS

This is the U.S. National Stage of PCT/EP2014/055589, filed Mar. 20, 2014, which in turn claims priority to French Patent Application No. 1352626, filed Mar. 25, 2013, the entire contents of all applications are incorporated herein by reference in their entireties.

TECHNICAL FIELD

The present invention relates to a detector for detecting the traces of ionizing particles, the traces being produced by scintillation during the passage of the ionizing particles in a scintillator.

STATE OF THE PRIOR ART

A scintillator is a material which emits light following the absorption of an ionising radiation, such as a photon or a charged particle. In fact, when this material is traversed by a charged particle, itself potentially produced by a photon, the molecules of this material are "excited", that is to say that an electron goes from an energy level to a higher energy level. The de-excitation of this electron, that is to say the electron dropping back down to a lower energy level, is accompanied by the emission of a photon, which in the present case is a visible photon. When a particle (such as an electron, an alpha, or an ion for example) propagates in a scintillating material, light is emitted along the path. The quantity of light produced may be linked to the quantity of energy brought by the particle having interacted in the material. The measurement of this quantity of light thus makes it possible to measure the energy deposited in the scintillator. This latter application is the most frequent but these detectors are also used to localise interactions. This localisation can be achieved by either segmenting the scintillator or by determining the barycentre of the light emitted as in gamma cameras.

These gamma cameras are mainly used to detect radioactive materials, for example in the event of leakage in a nuclear power plant, and in the medical field in order to observe the organs of a patient and potential perturbations of these organs generated by diseases. To do so, a radioactive element which emits gamma photons is injected into the body of a patient. The observation of the gamma photons makes it possible to know the distribution of the radioactive element within the body. The gamma camera makes it possible to observe these gamma photons. To do so, a gamma camera generally comprises:

A collimator which makes it possible to select the direction of the photons that are going to form the image in the detection plane;
  A scintillator which makes it possible to convert the gamma photons into visible photons;
  Photomultipliers which make it possible to convert the visible photons into electric signals.

Collimators of the prior art are generally formed of very thin tubes which make it possible to select the gamma photons received by the scintillator. The thinner the tubes of the collimator, the better the spatial resolution of the gamma camera, but the smaller the quantity of photons received by the scintillator. Thus, in gamma cameras of the prior art, it is necessary to inject substantial doses of radioactive product in order to obtain exploitable images.

Furthermore, there also exists in the prior art trace detectors. The first trace detectors were cloud chambers and bubble chambers in which photos were taken which it was then necessary to digitize on projection tables. With the wire chamber, the direct digitization of data became possible. Today, trace detectors of drift chamber type are commonly used to detect the trace of charged particles on large surfaces. These gaseous detectors procure a spatial resolution less than 150 µm for a low number of measuring channels, but they are bulky and they require envelopes to contain the gas and pipes to renew the gas. Silicon trace detectors do not have these drawbacks and make it possible to attain resolutions of several tens of microns. Nevertheless, silicon strip detectors, a fortiori silicon pixel detectors, require a very large number of measuring channels, one per strip or per pixel, and the consumption of the system may become prohibitive. Furthermore, these silicon detectors are relatively costly.

DESCRIPTION OF THE INVENTION

The invention aims to overcome the drawbacks of the prior art by proposing a detector for detecting the traces of particles in a scintillator of which the electrical consumption and the cost remain reasonable, without sacrificing spatial resolution.

Another object of the invention is to propose a detector for detecting the traces of particles which makes it possible to produce an image in three dimensions of a trace of ionizing particle.

Finally another object of the invention is to propose a gamma camera which is much more sensitive than those of the prior art.

To do so, the invention proposes using a microlens array to produce an image of the scintillating trace. Each microlens of the microlens array projects, onto an imager, the image of the trace of the ionizing particles. Thus, according to the invention, the information on the trace in the scintillator is no longer transmitted in an electrical manner, but in an optical manner thanks to the microlenses which focus the photons emitted by the scintillating trace on the imager.

More precisely, the invention proposes, according to a first aspect, a detector for detecting the traces of ionizing particles comprising:

A scintillator capable of emitting photons when ionizing particles pass therethrough;
  A first imager capable of detecting each photon emitted by the scintillator;
  A first microlens array, each microlens of the first microlens array being arranged such as to produce an image of the trace of the ionizing particles by focusing the photons emitted in the scintillator on the first imager.

The fact of using a microlens array makes it possible to detect ionizing particles when they create a small quantity of photons in the scintillator. Moreover, thanks to the use of microlenses, the spatial resolution of the detector is limited uniquely by the optical characteristics of the microlenses and by the spatial resolution of the imager. Moreover, the use of a microlens array makes it possible to have very good field depth, such that the image may be sharp whatever the position of the scintillating zone, that is to say the zone of the scintillator in which the photons are emitted. In addition, the fact of using a microlens array makes it possible to produce a stereoscopic image of the trace created in the scintillator. This information in three dimensions makes it possible to use a coded mask arranged between the source of particles and the scintillator instead of a collimator so as to increase the detection efficiency of a gamma camera.

The particle detector may also comprise one or more of the following characteristics taken individually or according to any technically possible combinations thereof:
- the first imager comprises a plurality of elementary detectors, each microlens of the first microlens array being optically coupled to at least two elementary detectors of the first imager;
- each microlens of the first microlens array has a focal distance, the distance D between the first microlens array and the first imager being strictly greater than the focal distance of the microlenses;
- the first imager has a spatial resolution better than 1 mm and advantageously better than 200 µm, so as to be able to localise precisely an ionizing particle;
- the first imager must be preferably sufficiently sensitive so as to be able to detect and localise each photon in the scintillator that is to say that the signal produced by each photon must be greater than the noise;
- the first imager may be formed of a CMOS or of a CCD (charge coupled device);
- the first imager preferably comprises a matrix formed of several elementary detectors, or pixels, each elementary detector being capable of creating charges when it receives a photon;
- each elementary detector has preferably dimensions less than or equal to 1 mm, and in a more preferential manner less than or equal to 200 µm, so as to form an imager having very good spatial resolution;
- each elementary detector is preferably a photomultiplier, advantageously an avalanche photodiode. Each avalanche photodiode operates preferably in saturated mode or Geiger mode, such that each avalanche photodiode forms a pixel indicating the presence or the absence of photon received in the zone of the space that it represents. Such an imager makes it possible to have very good spatial resolution while having very good sensitivity and being very rapid;
- the first imager also preferably comprises a digital reading system capable of identifying which elementary detector has received a photon;
- the detector for detecting the traces of particles preferably comprises calculation means capable of calculating the three-dimensional position of the scintillating zone in the scintillator from images of the scintillator projected onto the first imager by the microlenses. In fact, each microlens projects a different image of the scintillator onto the first imager. By comparing the images projected by several different lenses, it is thus possible to reconstitute an image in three dimensions of the scintillator with very good spatial resolution;
- the scintillator has preferably a parallelepiped shape comprising:
    - a principal detection face extending along a reference plane (x,y);
    - a secondary detection face extending perpendicular to the reference plane (x,y);
- the first microlens array and the first imager extend preferably parallel to the principal detection face, so as to have very good spatial resolution in (x,y) whatever the depth z at which it lies in the scintillator;
- the detector further comprises preferably:
    - a second imager capable of detecting each photon coming from the scintillator;
    - a second microlens array, each microlens of the second array being arranged such as to produce an image of the trace of the particles by focusing the photons emitted in the scintillator on the second imager;
- the second microlens array and the second imager extend preferably parallel to the secondary detection face of the scintillator so as to increase the spatial resolution of the detector along the direction perpendicular to the reference plane;
- each microlens array has preferably a square mesh;
- each microlens has preferably dimensions comprised between 0.5 and 5 mm;
- each microlens has preferably a numerical aperture comprised between 0.2 and 0.3, so as not to limit the quantity of photons which will be focused in good conditions.

The detector for detecting the traces of ionizing particles according to the invention makes it possible to visualise in particular traces of charged particles such as particles, ions, protons, electrons resulting potentially from an interaction of high energy photons such as X or gamma photons. In fact, it is thus possible to produce by stereoscopy images in three dimensions of the traces of ionizing particles in the scintillator without having to resort to a large number of measuring channels.

According to another embodiment, the detector for detecting the traces of particles may be a gamma camera. Such a gamma camera then has very great sensitivity, around 100 times better than gamma cameras of the prior art, and good spatial resolution.

In the case where the detector for detecting the traces of particles is a gamma camera, the detector for detecting the traces of particles preferably comprises a coded mask arranged between the source of gamma photons and the scintillator. It is the use of the microlens array which enables the use of the coded mask at a short distance from the source (for example less than 1 m), which itself makes it possible to increase considerably the number of gamma photons arriving on the scintillator and thus to increase the sensitivity of the camera.

BRIEF DESCRIPTION OF THE FIGURES

Other characteristics and advantages of the invention will become clearer from the detailed description that follows, with reference to the appended figures, which illustrate.

For greater clarity, identical or similar elements are marked by identical reference signs in all of the figures.

DETAILED DESCRIPTION OF AT LEAST ONE EMBODIMENT

Figure 1:
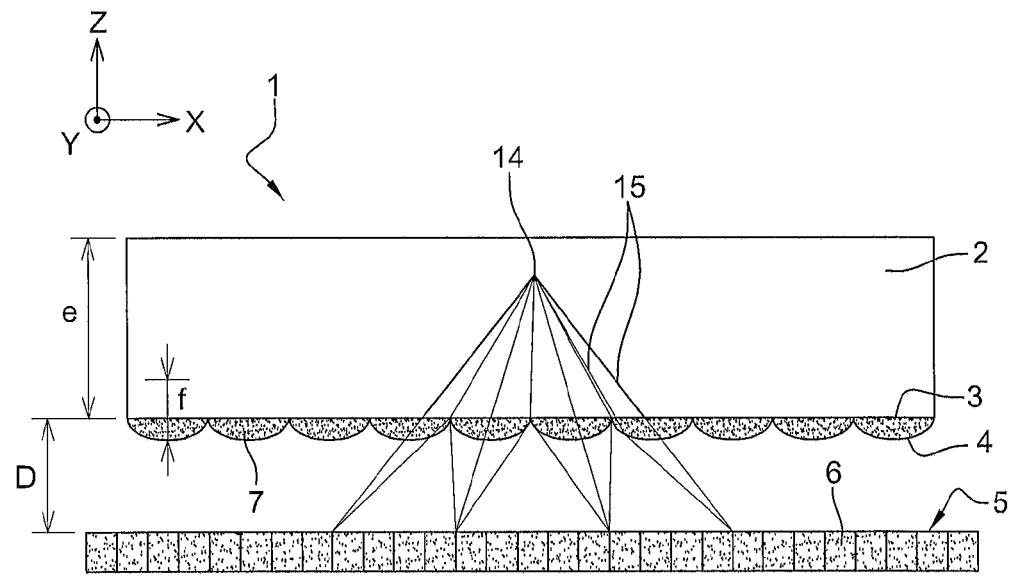
FIG. 1, a schematic representation of a detector for detecting the traces of particles according to a first embodiment of the invention.

FIG. 1 represents a detector 1 for detecting the traces of ionizing particles according to a first embodiment of the invention. In this first embodiment, the detector 1 is a detector of traces which makes it possible to visualise the scintillating trace generated by the passage of an ionizing particle in the scintillator. "Ionizing particle" is herein taken to mean a charged particle such as a proton, an ion, or an electron, resulting potentially from the interaction of a high energy photon such as X or gamma photons.

The detector for detecting the traces of ionizing particles 1 comprises a scintillator 2. The scintillator 2 is a scintillating medium, that is to say that it is formed by a material capable of emitting photons, in general by fluorescence, when ionizing particles that it is wished to monitor pass therethrough. Thus, generally speaking, an ionizing particle produces at least one interaction 14 in the scintillator material 2. This interaction releases a large quantity of photons, called scintillation photons 15, the latter being detected by an imager 5 optically coupled to the scintillator 2. An ionizing particle can interact on repeated occasions in the scintillator. Although these interactions take place successively over time, their time lag is so small that they can be considered as simultaneous. Thus, an ionizing particle detected by the detector 1 produces at least one or more interactions 14 in the detector. The set of places of interaction in the detector constitutes the trace of the particle in the detector. The trace may be one-off (a single interaction point) or have the form of a straight line or an erratic curve, connecting the different interaction points.

The material chosen for the scintillator 2 must be as scintillating as possible, that is to say produce the greatest possible number of photons per lost energy unit, that is to say preferably at least 5 photons per keV. The scintillating material is preferably very transparent to the light that it produces and without envelope.

According to different embodiments and as a function of the particles that it is wished to detect, different scintillating materials may be chosen. In fact, the scintillating material chosen depends on the type of particle to detect, the parameters to measure, the required precision, the flux of particles to detect, or instead the environment.

According to a preferential embodiment, the scintillating material chosen is a plastic scintillator. In fact, plastic scintillators have the advantage of being non-hygroscopic, such that they do not require an envelope to contain them, any envelope being capable of deviating the charged particles. Moreover, plastic scintillating materials may be produced in very large volumes, which makes it possible to produce devices of large dimensions. Furthermore, plastic scintillators are very transparent to the light that they produce. Finally, they produce of the order of 10 photons per keV of energy deposited in a trace. For gamma cameras, scintillating crystals (inorganic materials) such as NaI or $LaBr_3$ will be preferred.

The scintillator has preferably a parallelepiped shape, but other shapes may be envisaged such as the icosahedron because the more faces there are, the fewer constraints there will be on the numerical aperture of the microlenses. The scintillator preferably comprises a principal detection face 3 which extends along a reference plane (x, y) defining directions x and y. The direction z is defined as being perpendicular to the reference plane (x, y).

The particle detector 1 also comprises an imager 5. The imager 5 is capable of detecting each photon emitted by the scintillator 2. To do so, the imager must have a spatial resolution less than 1 mm, advantageously less than 200 µm. Moreover, to avoid the superposition of traces, the reading time of the imager must be much shorter than the average time between two successive particles. This average time depends on the dimensions of the detector and on the flux of particles. For a flux of 100 particles per second, a reading time of the order of a millisecond is necessary. For a flux 1000 times greater, the reading time will be of the order of a microsecond. The imager 5 preferably comprises a matrix of elementary detectors 6, each elementary detector 6 being capable of emitting a current if it receives a photon. Each elementary detector 6 has preferably dimensions less than or equal to 50 µm. Each elementary detector thus forms a pixel. Moreover, the imager comprises a system for digitally reading the elementary detectors making it possible to identify which elementary detector has received a photon.

Each elementary detector (or pixel) is preferably a photomultiplier such as for example an avalanche photodiode or silicon photomultiplier SiPM. In this case, the imager 5 is thus formed by a matrix of photomultipliers. In the case of avalanche photodiodes, a voltage is applied to each of them such that the avalanche photodiode operates in saturated mode or Geiger mode. Moreover, each avalanche photodiode 6 has preferably dimensions less than or equal to 50 µm, such that each avalanche photodiode forms a pixel. Thus, if one of the avalanche photodiodes receives a photon, it generates a pulse which makes it possible to identify the corresponding pixel in the digital image. Thus, the imager makes it possible to know with very good spatial resolution in which zone of the space a single photon arrives. Moreover, avalanche photodiodes have the advantage of being very rapid, that is to say of having a reaction time of the order of a nanosecond and consuming very little electric power. The imager 5 thereby formed extends along a plane parallel to the reference plane (x, y).

According to another embodiment, the imager 5 may also be constituted of a CMOS or a CCD.

The particle detector also comprises a first microlens array 4. Each microlens 7 is arranged to focus the photons emitted in the scintillator in the plane of the imager 5 and does so with good spatial resolution whatever the depth z at which these photons are emitted in the scintillator. The spatial resolution is optimised by placing the imager near to the focal plane of the microlenses, the distance to the focal position being optimised as a function of the depth of the scintillator.

The fact of placing the imager at the focal distance of the microlenses would lead to focusing visible photons of which the incidence angle is normal to the plane supporting the microlenses 7. This leads to a focusing known as "infinite", which makes it possible to produce a sharp image of the traces generated at a great distance from the microlenses, a distance considered as infinite compared to the dimensions of the lenses.

Figure 2:
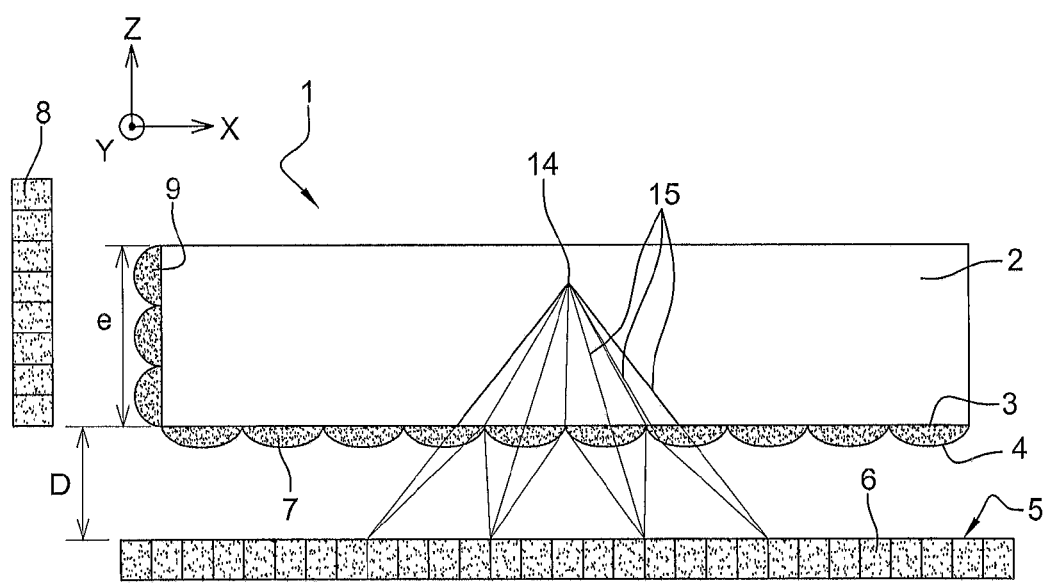
FIG. 2, a schematic representation of a detector for detecting the traces of particles according to a second embodiment of the invention.
Figure 3:
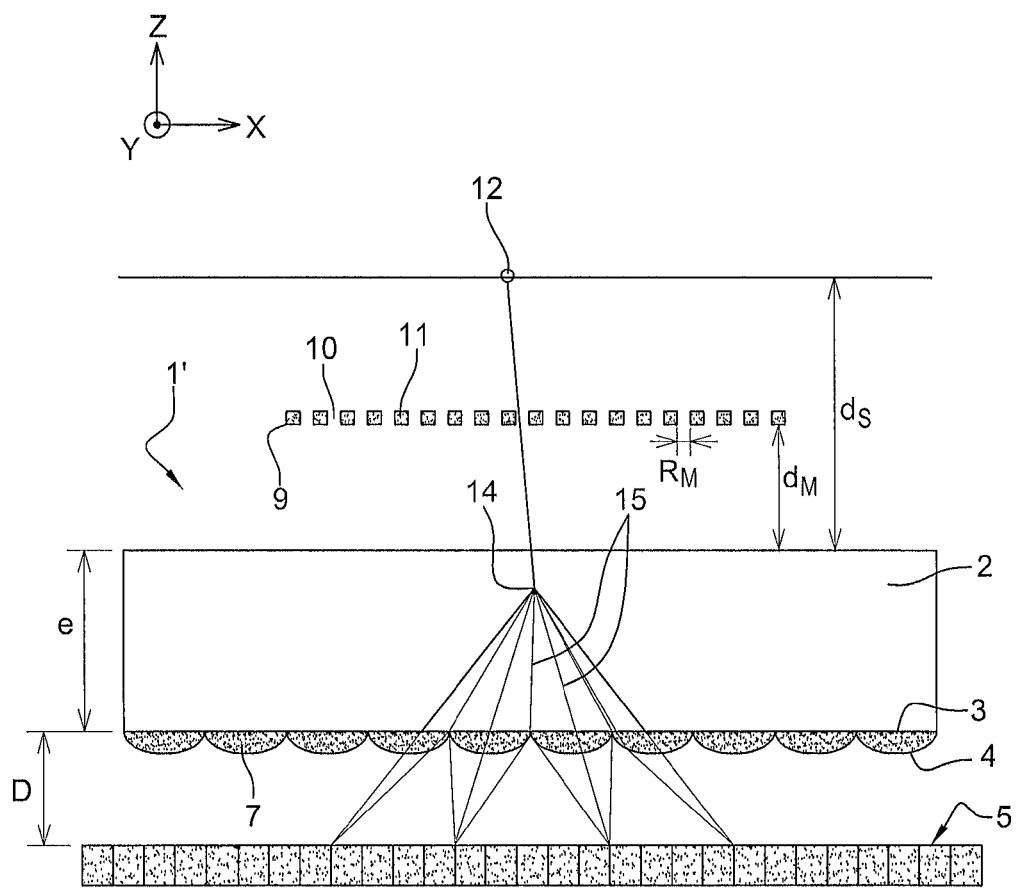
FIG. 3, a schematic representation of a gamma camera according to a third embodiment of the invention.

However, the objective of the device of FIGS. 1 to 3 is to image the places of interactions 14 in the scintillator 2, said scintillator having a thickness e of the order of a centimetre, comprised for example between 0.5 and 2 cm, for example equal to 1 cm. In other words, each microlens 7 is configured to produce, on the photoelementary detectors 6, a sharp image of an interaction 14 in the scintillator 2, this interaction 14 producing scintillation photons 15. It is understood that this interaction 14 takes place at a distance less than the thickness e of the scintillator 2. It is impossible to produce an image of a source situated at a distance from a lens less than the focal distance f. Also, each microlens 7 has preferably a small focal distance, less than 0.5 cm, and for example equal to 0.1 cm, so as to be able to produce sufficiently sharp images of the interactions taking place at depth in the scintillator 2, that is to say near to the array of lenses 4.

Furthermore, a distance e' is determined, with respect to the microlens 7, at which the objects observed, in this instance the interactions 14 generating visible photons, have to be sharp. In the example represented in FIGS. 1 to 3, the microlenses 7 being placed side by side with the scintillator 2, the distance e' is naturally less than or equal to the thickness e of the scintillator, and greater than the focal distance of the microlenses.

Knowing f and e', it is possible to determine the distance D between the plane of the first microlens array 4 and the matrix of photodetectors 6, according to the expression:

$$D = f + \frac{f^2}{e' - f}$$

By taking f=0.1 cm and e'=1 cm, e'=0.5 cm, e'=0.2 cm, respectively D=0.11 cm, D=0.125 cm and D=0.2 cm, i.e. 2f are obtained Thus, generally speaking, the distance D between the first microlens array 4 and the imager 5 is strictly greater than the focal distance of the microlenses. Thus, D >f, and preferably, f<D≤2f, in particular 1.1 f≤D⁻ 2f. The more D moves away from f, the more the sharpness area in the scintillator 2 comes closer to the microlens array 6. Conversely, the closer D comes to f, the more the sharpness area in the scintillator moves away from the microlens array, and comes closer to the upper face 18 of the scintillator 2, this upper face designating the face of the scintillator 2 exposed to the incident radiation.

This distance D may be adapted, according to whether it is wished to have available a sharper image of the interactions 14 produced in the upper part of the scintillator, that is to say near to the upper face 18, or in the lower part of the scintillator that is to say near to the detection face 3.

Each microlens is optically coupled to a plurality of pixels 6 constituting the matrix imager 5. Typically, each lens is optically coupled to a group of n*n pixels, with n >1. Preferably, n is comprised between 10 and 100. There are thus fewer microlenses 7 than pixels 6. Typically, the number of pixels 6 is greater than 10 times, or even 100 times, or even 1000 times (or even more) the number of microlenses 7.

When an interaction 14 occurs in the scintillator 2, scintillation photons 15 are generated, and a part of them reach a group of m microlenses. In the example of FIGS. 1 to 3 is represented a group of 4*4 microlenses 7 "touched" by the scintillation photons. These touched microlenses are those that reach the photons of which the angle of incidence, with respect to the normal to face 3 is less than a limit angle of refraction $\theta_{lim}$. Each microlens 7 is coupled to a separate group of pixels 6. Also, according to this configuration, 16 images of the interaction 14 are obtained, each image corresponding to a group of pixels 6, each group of pixels being associated with a separate microlens.

Generally speaking, the device makes it possible to obtain a plurality of images of a trace formed by one or more interactions 14 in the scintillator 2. There are as many images as lenses collecting a sufficient quantity of scintillation photons 15. In other words, with such a device, the scintillation photons 15 reach m lenses, then making it possible to form m separate images on the imager. This makes it possible to obtain a 3-dimensional image of the trace in the scintillator 2, due to the fact that several images, corresponding to the same trace, are formed (stereoscopy). The precision of the spatial localisation of the trace depends on the distance of the interaction to the plane of the microlenses e', the focal distance of the microlenses 7, the distance between the plane of the microlenses 4 and the imager plane 5 and the dimension of the pixels 6. For an optimised system, it is typically of the order of the dimension of the pixels 6.

Each microlens is dimensioned so as to produce an image of a scintillating trace generated in the scintillator with a spatial resolution R given along the directions x and y, and to do so whatever the depth z at which the trace is formed in the scintillator. To do so, for a scintillator of depth p (in centimetres), each microlens of the first array has preferably a diameter of the order of $4.10^{-2} \cdot p^{1/2}$ and a numerical aperture α, with 0.2≤α≤0.3

Furthermore, if the mesh of the array is square, each microlens has preferably a square shape so as to minimise the zones not covered by the microlenses.

The first microlens array is preferably arranged on the principal face 3 of the scintillator. The first microlens array covers preferably the whole of the principal face 3 of the scintillator.

The microlenses give a multitude of points of view on the scintillating traces generated in the scintillator so that it is possible to reconstitute a 3D image of these traces by comparing the images formed by each of the microlenses in the plane of the imager, the pitch of the array of the projected images being linked to the distance between the trace and the plane of the microlenses. In fact, by comparing the difference of angle under which each lens of the first microlens array projects the trace, it is possible to calculate an image of the traces generated in three dimensions (stereoscopy).

The particle detector thereby formed thus makes it possible to have very good spatial resolution along x and along y, over the whole depth of the scintillator. Nevertheless, such a detector has less good spatial resolution along the direction z than along the directions x and y.

To improve the spatial resolution of the detector along the direction z, the particle detector may also comprise, as represented in FIG. 2, a second imager 8 arranged parallel to the direction z and a second microlens array 9 arranged between the second imager 8 and the second microlens array 9. Each lens of the second microlens array 9 is arranged so as to produce an image of the scintillating traces in the scintillator in the plane of the second imager 8.

According to an embodiment, the second imager 8 may be identical to the first imager, save for the fact that it is arranged parallel to a plane (y, z) instead of being arranged parallel to a plane (x, y). Similarly, according to an embodiment, the second microlens array may be identical to the first microlens array, save for the fact that it is arranged parallel to a plane (y, z) instead of being arranged parallel to a plane (x, y).

Nevertheless, it is also possible to envisage dimensioning the second microlens array and the second imager differently to the first microlens array and the first imager so as to obtain a different spatial resolution along the direction z to those that are obtained along the directions x and y.

In order to further enhance the spatial resolution and the sensitivity, if the scintillator comprises n faces, the detector may comprise n arrays of microlenses, each microlens array being positioned on one of the faces of the scintillator. In this case, the detector also comprises as many imagers as there are arrays of microlenses, so that each array of microlenses focuses the photons emitted in the scintillator in the plane of the associated imager.

FIG. 3 represents a particle detector according to another embodiment of the invention. In this embodiment, the particle detector is a gamma camera.

This gamma camera comprises, as in the preceding embodiments:

A scintillator 2;
A microlens array 4;
An imager 5.

The scintillator may for example be a solid scintillator made of sodium iodide or lanthanum bromide. The scintillator 2 comprises a first principal face 3 opposite to a second principal face 18. The second principal face 18 of the scintillator is arranged facing the source of gamma particles. The first principal face 3 is covered by the microlens array 4.

The microlens array 4 and the imager 5 are identical to those described in the preceding embodiments.

The use of a microlens array 4 is particularly advantageous in the case of a gamma camera because it enables the use of a coded mask 9, in particular in a medical use, where the source/scintillator distance is of the same order of magnitude as the dimension of the scintillator. In fact, only the three-dimensional information enables the correct reconstruction of the image of the mask. The coded mask 9 makes it possible to increase the efficiency of the gamma camera without degrading the spatial resolution.

The coded mask 9 is formed for example by a plate 11 pierced by holes 10.

For convenience in the explanations, the notion of efficiency $\epsilon_M$ of the coded mask will be introduced. This results from three parameters: the capability of the gamma camera to sample the image projected through the mask $\epsilon_e$, the linear absorption μ of the absorbing part of the mask and the transmission of the holes of the mask defined by the ratio between the number of photons, $N_d$, arriving on the detector and those, $N_i$, arriving on the holes of the mask:

$$\varepsilon_M = \varepsilon_e(1 - e^{-\mu x})\frac{N_d}{N_i}$$

where x is the thickness of the mask.

The material used to form the mask and its thickness play a leading role on this efficiency.

Dimension of the Holes of the Mask: $R_M$

The imaging capability of a coded mask is based on a sampling of the image projected by the mask. For good sampling efficiency, the dimension of the image of a hole of the mask projected onto the detector must be substantially greater than the spatial resolution of the detector. In practice a hole image size two to three times greater than the resolution of the detector ($\epsilon_e \sim 0.8$-$0.9$) is used. Thus, for a resolution of 200 microns at the level of the scintillator, hole images of 500 microns would be suitable.

Material

The mask is preferably absorbing and thin to avoid an effect of collimation which would reduce the efficiency of the mask. The material with the highest linear absorption will thus preferably be chosen. Thus, according to a preferential embodiment, the coded mask is made of a tungsten plate 11. In fact, this material offers very good mechanical strength and allows very fine machining.

Thickness

If x is the thickness of the plate 11, the limit angle is $\theta=\text{Arctg}(R_M/x)$. The coded surface may be defined as the surface of the holes which are projected onto the detector: $fc=(R_M(d_s-d_M)/x)^2/4$, with $d_s$ which is the distance between the source of gamma photons and the scintillator and $d_M$ which is the distance between the mask and the scintillator; this must be sufficient for it to be possible to form an image. The number of pixels of the reconstructed image is proportional to this coded surface. It is thus necessary that θ is as large as possible, thus $R_M/x$ must be as large as possible.

Nevertheless, a thick mask offers good opacity but can reduce the transmission of holes. When the plate 11 is made of tungsten, a thickness e of 5 mm offers a good compromise since the coded mask thus absorbs ¾ of the photons of 141 keV and that the transmission will only cancel itself out at 45°.

Mask-Detector-Source Distance

The distance $d_s$ between the source 12 and the scintillator 2 must be as small as possible to maximise the efficiency of the coded mask. Furthermore, the greater the $d_M$ mask-scintillator distance, the better the resolution at the level of the source, but the greater the source-mask distance, the better the transmission of the holes and the larger the coded surface. It is thus possible to optimise these distances as a function of the sought after imaging qualities (field, resolution).

Examples of Embodiment

The fine optimisation of such a gamma camera must be carried out as a function of the application but to fix ideas it may be useful to give several values. Let us consider a distance $d_s$ of 20 cm between the source of gamma photons and the scintillator and let us place at mid-distance between the source and the scintillator, a coded mask made of tungsten of 5 mm thickness pierced with holes of 5 mm sides on half of the surface.

Efficiency:

Around 15 to 20% of the photons falling on the mask pass through it ($N_i/N_d \sim 0.15$-$0.2$), the absorption of the mask is 0.75 and the sampling efficiency is around 0.9. The efficiency of the mask is thus of the order of 10 to 13%. For comparison, the efficiency of a collimator of a conventional medical camera does not exceed 0.1%. This gain of more than two orders of magnitude in efficiency results in a reduction of the same order of the dose of radioactive product injected into the patient.

Resolution:

The resolution at the level of the source is one millimetre i.e. 5 to 6 times better than that of a conventional medical camera.

Naturally the invention is not limited to the embodiments described with reference to the figures and variants may be envisaged without going beyond the scope of the invention. Thus, as a function of the particles to detect, other types of scintillating material may be chosen to form the scintillator. Furthermore, the choice of the imager depends on the choice of the scintillator and may thus also vary as a function of the particles to detect in particular.

The invention claimed is:

1. A detector for detecting the traces of ionizing particles comprising:
    a scintillator configured to emit photons when ionizing particles pass therethrough;
    a first imager configured to detect each photon emitted by the scintillator, and
    a first microlens array, each microlens of the first microlens array being arranged such as to produce an image of the trace of the particles by focusing the photons emitted in the scintillator on the first imager, the first imager and the first microlens array being spaced apart by a distance D, each microlens of the first microlens array being optically coupled to at least two elementary detectors of the first imager, each microlens having a focal distance strictly less than the distance D between the first microlens array and the first imager.

2. The detector for detecting traces according to claim 1, wherein the first imager is a CMOS or a CCD.

3. The detector for detecting traces according to claim 1, wherein the first imager comprises a matrix formed of a plurality of elementary detectors, each elementary detector being configured to create a charge when the elementary detector receives a photon, each elementary detector having dimensions less than or equal to 1 mm.

4. The detector for detecting traces according to claim 3, wherein each elementary detector is a photomultiplier.

5. The detector for detecting traces according to claim 4, wherein each elementary detector is an avalanche photodiode.

6. The detector for detecting traces according to claim 3, wherein each elementary detector has dimensions less than or equal to 200 μm.

7. The detector according to claim 3, wherein the first imager also comprises a digital reading system configured to identify which elementary detector has received a photon.

8. The detector for detecting traces according to claim 1, further comprising a calculator configured to calculate the position of the place of emission of each photon emitted in the scintillator from the images projected onto the first imager by the microlenses.

9. The detector for detecting traces according to claim 1, further comprising:
- a second imager configured to detect each photon emitted by the scintillator;
- a second microlens array, each microlens of the second array being arranged such as to produce an image of the trace of the particles by focusing the photons emitted in the scintillator on the second imager,
- the second microlens array and the second imager extending perpendicularly to the first microlens array.

10. The detector for detecting traces according to claim 1, wherein each microlens has dimensions comprised between 0.5 and 5 mm.

11. The detector for detecting traces according to claim 1, wherein each microlens has a numerical aperture comprised between 0.2 and 0.3.

12. A gamma camera comprising a detector for detecting traces according to claim 1.

13. The gamma camera according to claim 12, further comprising a coded mask.

\* \* \* \* \*